United States Patent [19]
Reum et al.

[11] Patent Number: 5,140,625
[45] Date of Patent: Aug. 18, 1992

[54] SYSTEM FOR TESTING 2B1Q TELEPHONY LOOPBACK CIRCUITS AND METHOD THEREFOR

[75] Inventors: Peter M. Reum, Littleton; Terry D. Bolinger, Aurora, both of Colo.

[73] Assignee: XEL Communications, Inc., Denver, Colo.

[21] Appl. No.: 664,402

[22] Filed: Mar. 4, 1991

[51] Int. Cl.$^5$ .................. G06F 11/00; H04M 3/30
[52] U.S. Cl. .................. 379/5; 371/20.6; 375/10
[58] Field of Search ............ 379/5, 27.28; 371/18, 371/20.6, 20.5; 375/10

[56] References Cited

U.S. PATENT DOCUMENTS 4,918,623  4/1990  Lockitt et al. ............. 371/20.6

FOREIGN PATENT DOCUMENTS 0026947  2/1982  Japan .................. 371/20.6

Primary Examiner—Stafford D. Schreyer
Attorney, Agent, or Firm—Dorr, Carson, Sloan & Peterson

[57] ABSTRACT

A system for testing 2B1Q private line data telephony circuits having 2B1Q modulation between the network channel termination equipment and the channel unit. 2B1Q modulation is provided over a single pair of wires connected to the E and M leads of the channel unit. The system can deliver testing signals from two different sources. The first source is from a remote testing system connected to a remote access system which in turn is connected to the T, T1, R, and R1 output leads of the channel unit. The remote testing system generates conventional testing signals which are converted into digital signals for directly communicating with the 2B1Q pair of wires. The remote testing system delivers conventional tests for testing the loopback of the channel connected to the single pair of wires and to the network channel termination equipment. Under a second source of tests, the interface of the present invention directly connects to the T1 carrier. Testing digital signals are delivered from a distant source into the interface which are then delivered to the 2B1Q channel between the channel unit and the network channel termination equipment for performing loopback testing of the private line data circuit there between.

9 Claims, 4 Drawing Sheets

SYSTEM FOR TESTING 2B1Q TELEPHONY LOOPBACK CIRCUITS AND METHOD THEREFOR

BACKGROUND OF THE INVENTION

1. Field of the Invention

The present invention relates to telephony communications and, more particularly, to the testing of loopback circuits using 2B1Q modulation for transmission such as found in private line data circuits.

2. Statement of the Problem

ISDN (Integrated Services Digital Network) standards have been promulgated for Basic Rate and Primary Rate transmission. The Primary Rate sets standards for the transmission of high speed T1-type signals at a transmission rate of 1.544 Mb/s. The ISDN standard for the Primary Rate is known as the 23 B+D. The ISDN standard for Basic Rate which is used for the transmission of two distinct conversations or data signals is known as 2B+D (i.e., the two voice circuits plus one data circuit).

For the Basic Rate, each conversation or data signal is delivered at a data rate of 64 Kb/s with a 16 Kb/s signaling channel. This rate corresponds to a payload data rate of 144 Kb/s with overhead information of 16 Kb/s. Hence, the full data rate for the Basic Rate is 160 Kb/s per second.

The Basic Rate 2B1Q transmission scheme utilizes four discrete voltage levels (+3, +1, −1, −3 volts). Each discrete voltage level represents two bits of information and, therefore, the 160 Kb/s data rate is actually transmitted at 80 Kb/s. The 2B1Q modulation scheme is an important improvement over traditional analog transmission schemes which are significantly affected by circuit impairments that degrade normal analog transmission such as impulse noise or cross-talk. The 2B1Q scheme utilizes integrated circuits which include transceiver circuits, ECHO cancellation, control circuitry, interface circuitry and which provides for bidirectional transmission over a single pair of wires.

Although 2B1Q technology for Basic Rate transmission represents a significant improvement over conventional analog transmission schemes, telephone companies have a substantial investment in test equipment based upon the analog transmission approach. Hence, a problem arises that a need exists for implementing the 2B1Q digital type transmission scheme in a fashion so as to retrofit with existing telephony circuits and, in particular, to enable the operating telephone companies to utilize the substantial equipment in the field based upon the analog transmission scheme such as the testing equipment for current private line data circuits of the type shown in FIG. 1.

In FIG. 1, two conventional private line data circuits 10 are shown interconnected with two channel units 80 in a conventional channel bank 20. The two private line data circuits 10 also interconnect to customer provided equipment (CPE) 30 over a network 40 such as modems 32. A point of demarcation exists between the CPE 30 and the telephone network 40. The channel unit 20 can be conventionally a D4 or an SLC 96 channel unit and is connected to conventional T1 transmission lines 50.

The arrangement shown in FIG. 1 permits the long distance connection of computers so that two computers can talk directly to each other, transfer data, and to do this with a minimal amount of errors in the transmission. In FIG. 1, each four wire equalized transmission only (ETO) channel unit 80 in the central office channel bank 20 is connected to a data station termination (DST) 12 at the customer's premise. DSTs constitute termination equipment generally referred to as network channel termination equipment (NCTE). If two data circuits B1 and B2 are required at the customer's premise, then two four wire ETO channel units and two DSTs are required. This is the configuration of FIG. 1. Each data circuit 10 requires two cable pairs 60 and 70—one pair (T1, R1) 60 for transmit and one pair (T,R) 70 for receive. In the configuration of FIG. 1, four cable pairs are required for implementation of the two separate analog data circuits 10.

Private line data circuits 10 including the actual cable pairs and the DSTs must be tested. For example, the channel units 80 and the DSTs 12 must be aligned for a one KHz level and frequency response. This alignment procedure is complicated and typically requires several persons. The alignment procedure also involves multiple sending and measuring sequences. Furthermore, the operation of these components 12 and 80 can be effected by impairments on the cable pairs 60 and 70 such as impulse noise, cross-talk or 60 Hz interference.

In FIG. 2, a first conventional approach for testing the private line data circuits 10 of FIG. 1 is shown for one circuit. Most telephone companies use remote testing 230 and remote access 240 systems to access the private line data circuit and to measure the tones appearing thereon. For example, to facilitate remote testing of the circuit, a DST 12 is often equipped with a loopback circuit 200 having relay contacts 210A, 210B and 210C. Loopback is a method of performing transmission tests of access lines from the serving switching center (i.e., the channel bank 20) that does not require the assistance of personnel at the served terminal (i.e., the NCTE). This loopback circuit 200 connects the incoming signal on the receive line 70 back to the transmit lines 60 by opening contacts 210A and 210B and closing contact 210C. Hence, an analog signal can be transmitted from the channel unit 80 to the DST 12 looped back at the DST 12, received and measured at the channel unit 80. This verifies the integrity of the entire circuit 10 from one central location. The loopback circuit 200 detects a unique tone for a predetermined period of time such as two seconds on lines 220 and then activates the contacts 210A through 210C.

In FIG. 2, the testing equipment 230 is connected to a remote access system 240 containing relay contacts 250A through 250D. The remote testing system is connected over lines 232 to the remote access system 240. Hence, when it is desired to conduct a test of the circuit, the remote testing system 230 causes the remote access system 240 to open contacts 250A and 250B and to close contacts 250C and 250D. This physically disconnects the channel unit 80 from the transmit receive lines 60 and 70 and enables the remote testing system 230 to send a testing tone on receive lines 70 to activate the loopback 200 to respectively close contact 210C and to open contacts 210A and 210B. The remote testing system 230 can then generate a conventional predetermined pattern of analog signals to thoroughly test the entire circuit. Upon completion of the test, the loopback circuit 200 is deactivated thereby closing contacts 210A and 210B and opening contacts 210C and causing the remote access system 240 to close contacts 250A and 250B and to open contacts 250C and 250D. FIG. 2 illustrates the loopback for the B1 circuit, the second B2 circuit would operate in the same fashion as a separate loopback.

A second conventional loopback test can be originated from a distant location such as at a central office or other central location. A digital signal corresponding to the required loopback tone is delivered on the T1 carrier, converted into analog signal on the T, R, T1, R1 leads for delivery into the DST. Loopback is detected and relay 200 activated so as to perform the remaining tests.

It is also to be expressly understood that a number of configurations exist in the telephone company environment and while FIGS. 1 and 2 show two private line data circuits each having four wire channels, it is to be expressly understood that one or more data circuits could be provided to a customer and that two wire circuits could be utilized. It is also to be expressly understood that a loopback could be provided in the channel unit and that the T1 carrier and channel unit can be tested from the distant location.

Furthermore, most telephone companies utilize testing systems such as a switched maintenance access system (SMAS) or a switched access system (SAS) as the remote access system 240 and utilize a switched access remote test system (SARTS) for the remote testing system 230. These are conventional access and testing systems and are well known in the telephony art. The remote access systems 240 connect metallically to the tip and ring leads of pairs 60 and 70 at the channel unit 80. Additionally, as shown in FIG. 2, E and M leads 280 are also provided to the channel units 80. These E and M leads 280 are available in the channel unit as the transmit and receive leads for signaling. However, the E and M leads are not used as part of the remote testing system 230 or the remote access system 240. Conventionally, the six leads of the channel unit 80 (i.e., T, T1, R, R1, E and M) are typically wired out to a manual crossconnect frame (not shown).

A need, therefore, exists to utilize existing telephone company remote testing systems 230 and remote access systems 240 such as SMAS, SAS, and SARTS and/or conventional distant loopback tests, as a telephone company implements the 2B1Q modulation transmission scheme between NCTEs such as DSTs and channel units 80 or for testing loopbacks in channel units.

3. Solution to the Problem

The present invention provides a solution to the problem through a unique implementation of the 2B1Q modulation technology such as between conventional NCTE such as DSTS and channel units so that conventional remote testing and access system equipment and/or distant testing equipment can be fully utilized.

SUMMARY OF THE INVENTION

The system for testing 2B1Q private line data telephony circuits of the present invention interfaces with a conventional channel unit having a 2B1Q interface between the network channel termination equipment and the channel unit. The 2B1Q interface is provided over a single pair of wires connected to the E and M leads of the channel unit. The interface is universal and can deliver testing signals from two different sources. The first source of testing signals is analog and is from a conventional remote testing system connected to a conventional remote access system which in turn is connected to the T, T1, R, and R1 leads of the channel unit. The remote testing system generates conventional testing signals which are converted by the testing interface of the present invention into digital signals for directly communicating with the 2B1Q interface. The remote testing system delivers conventional tests for testing up to two separate loopbacks of the channel connected to the single pair of wires and to the network channel termination equipment.

A second source of testing signal is digital and is from a distant location which is delivered over the T1 carrier. The interface of the present invention directly connects to the T1 carrier. The received digital test signals are delivered from a distant source into the interface which are then delivered to the 2B1Q channel between the channel unit and the NCTE for performing loopback testing of the private line data circuits there between.

DETAILED SPECIFICATION

1. Testing System Interface

Figure 2:
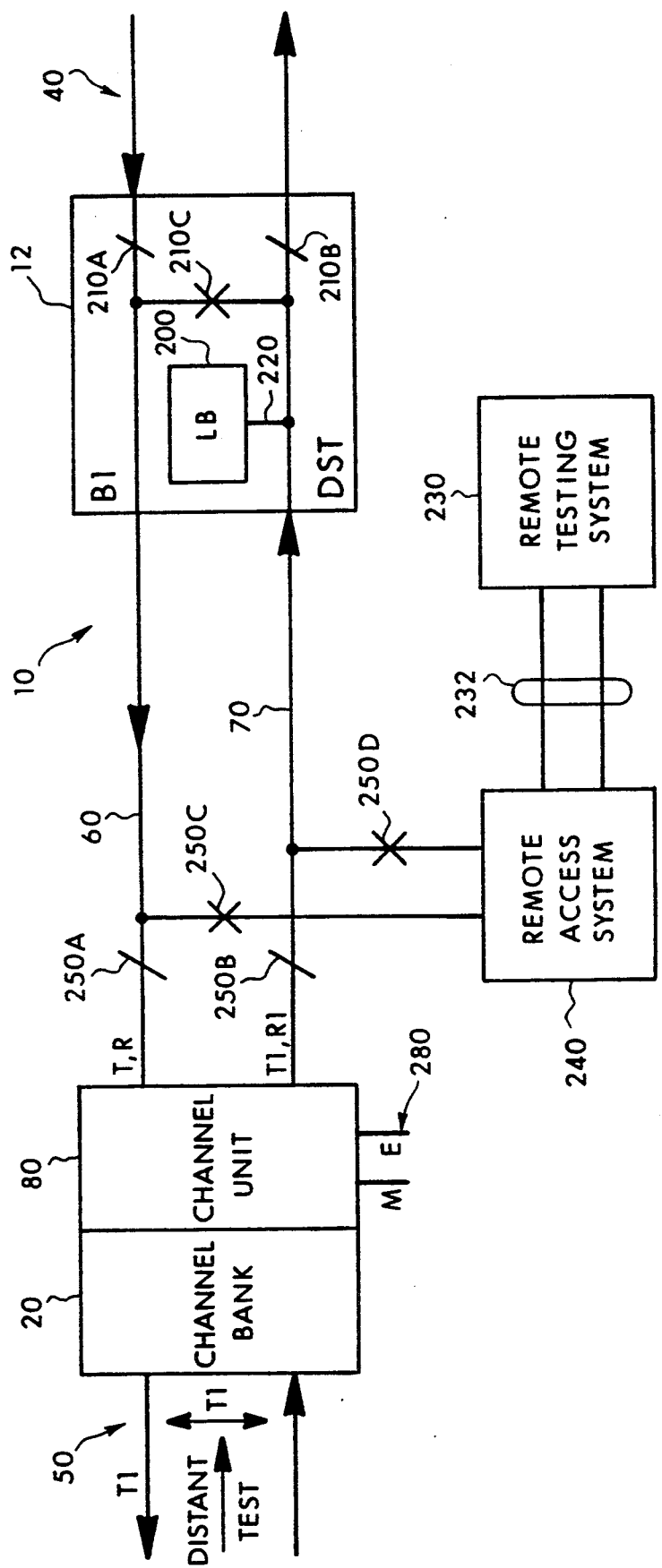
FIG. 2 is a prior art configuration illustrating the remote testing of the loopback circuit in the data station terminal.
Figure 3:
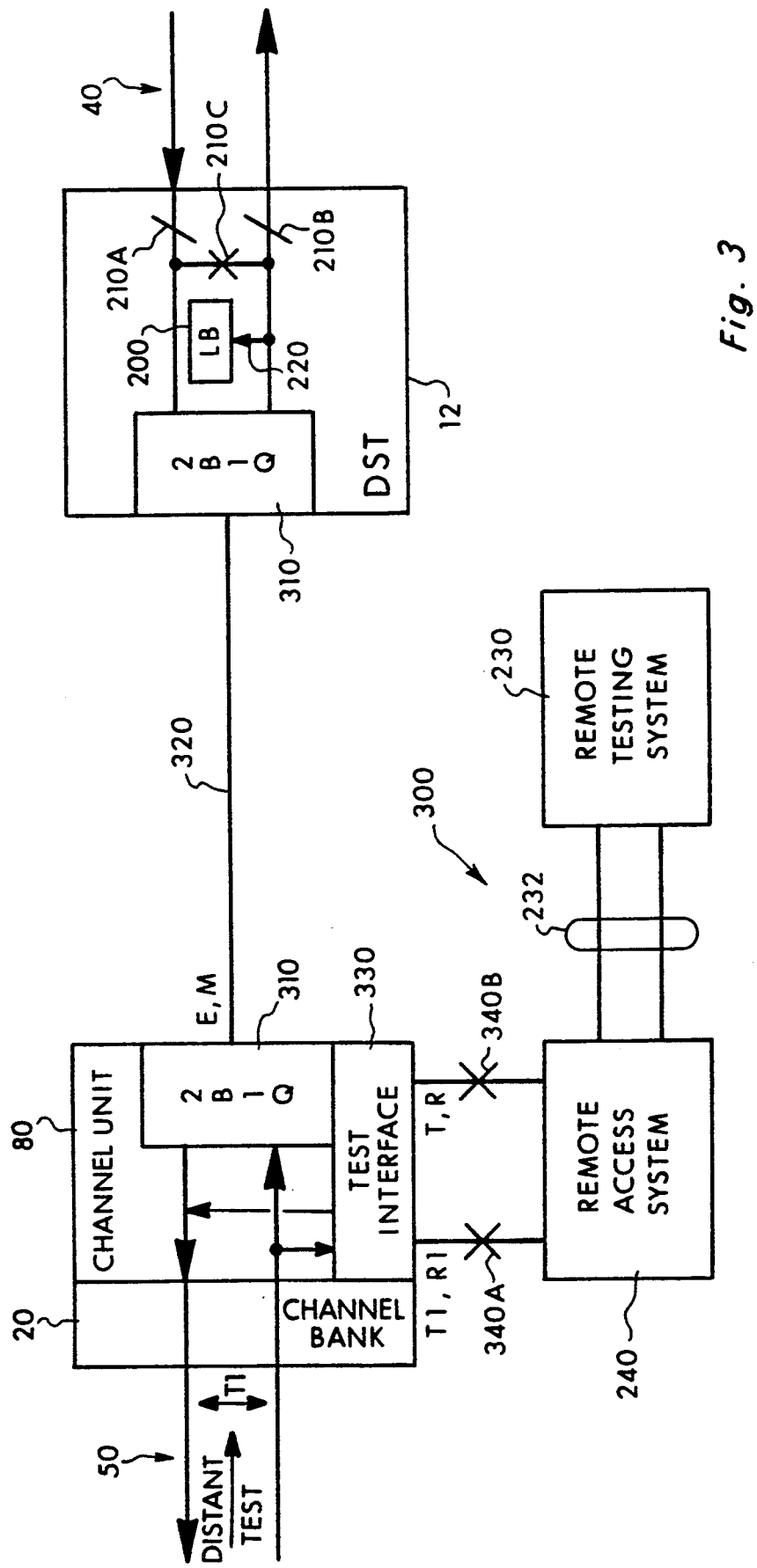
FIG. 3 is a block diagram of the present invention illustrating the configuration of interfacing conventional remote testing systems with the 2B1Q transmission scheme.

In FIG. 3, the testing system 300 of the present invention is shown interconnected with a channel unit 80 and network channel termination equipment (NCTE) such as DST 12. In comparison to FIG. 2, it is first noted that the DST 12 contains the loopback circuit 200 and it is secondly noted that the same remote testing system 230 and remote access system 240 equipment are also utilized. In this embodiment, the DST 12 has the necessary circuitry 310 to perform the 2B1Q communication over the single pair of wires 320 interconnecting the DST 10 and the channel unit 80. The circuitry 310 to provide this communication according to the 2B1Q transmission scheme is conventionally available.

Under the teachings of the present invention, the 2B1Q communication occurs over the E and M lines. The T, T1, R, and R1 lines which are conventionally available in the channel unit 80 are now used to interconnect through a test interface circuit 330 to the remote access system 240 as shown in FIG. 3. This is a preferred embodiment and it is to be understood that two of the six leads could be used for the pair 320 with the remaining four leads used for connection to the remote access system 240.

Contacts 340A and 340B connect the remote access system 240 to the test interface 330 which then delivers a message corresponding to the necessary tone (i.e., 2713 Hz or 2913 Hz) to the DST 12 over lines 320. Detection of these tones, as will be explained later, occur in the interface 330. As before, the loopback circuit 200 detects the message on lines 220 causing contacts 210A and 210B to open and contacts 210C to close. The DST 12 is now in the loopback mode. As before, the remote testing system 230 can conduct the appropriate tests through the remote access system 240, through the test interface 330, through the 2B1Q interface 310 in the channel unit 80, over the E and M pair 320, and into the 2B1Q interface 310 of the DST 10.

This signal is looped back and is delivered into the remote testing system 230 for analysis.

As shown in FIG. 3, only one pair of wires, the E and M pair 320, are utilized thereby freeing up one pair of wires. The channel unit 80 leads T, R, T1 and R1 are used to connect to the remote access system 240 of FIG. 2 that conventionally exists at the channel bank 20. This represents a considerable cost savings to the telephone operating company in that the same equipment can be utilized to test the 2B1Q transmission circuit. Hence, the analog signals from the remote testing system 230 or the digital signals from the distant test are inserted into the 2B1Q interface 310 for transmission to the DST 12 which transmission occurs, in the present invention, over the E and M pair. The loopback circuit 200 detects the loopback command and activates contacts 210 to go into loopback. The loopback signal is then sent back to the testing system at the channel unit over the remaining E & M lead 320. Test interface circuit 330 receives the sent-back signals and performs the necessary conversions and interfaces for delivery through the remote access system 240 to the remote testing system 230.

Additionally, the testing interface 330 of the present invention accommodates tests to be delivered over the T1 lines 50 from a distant or central location. Hence, a single test interface 330 is designed to interface with distant tests only, with remote tests 230 only, or selectively between distant tests over the T1 carrier 50 and/or the remote tests 230.

From the above, several significant advantages are provided by the arrangement of the present invention. First, the test equipment does not have to be compatible with 2B1Q transmission protocol. This means that existing SMAS, SARTS, and SAS equipment can be fully utilized. Secondly, little additional wiring is required. Third, testing routines will need little if any modifications. Hence, this allows the operating telephone company to take advantage of the benefits of 2B1Q transmission with little change in their operating procedures.

It is to be expressly understood that while a preferred embodiment of the present invention tests a DST any NCTE or channel unit could be suitably tested under the teachings of the present invention.

2. Test Interface Circuit

Figure 4:
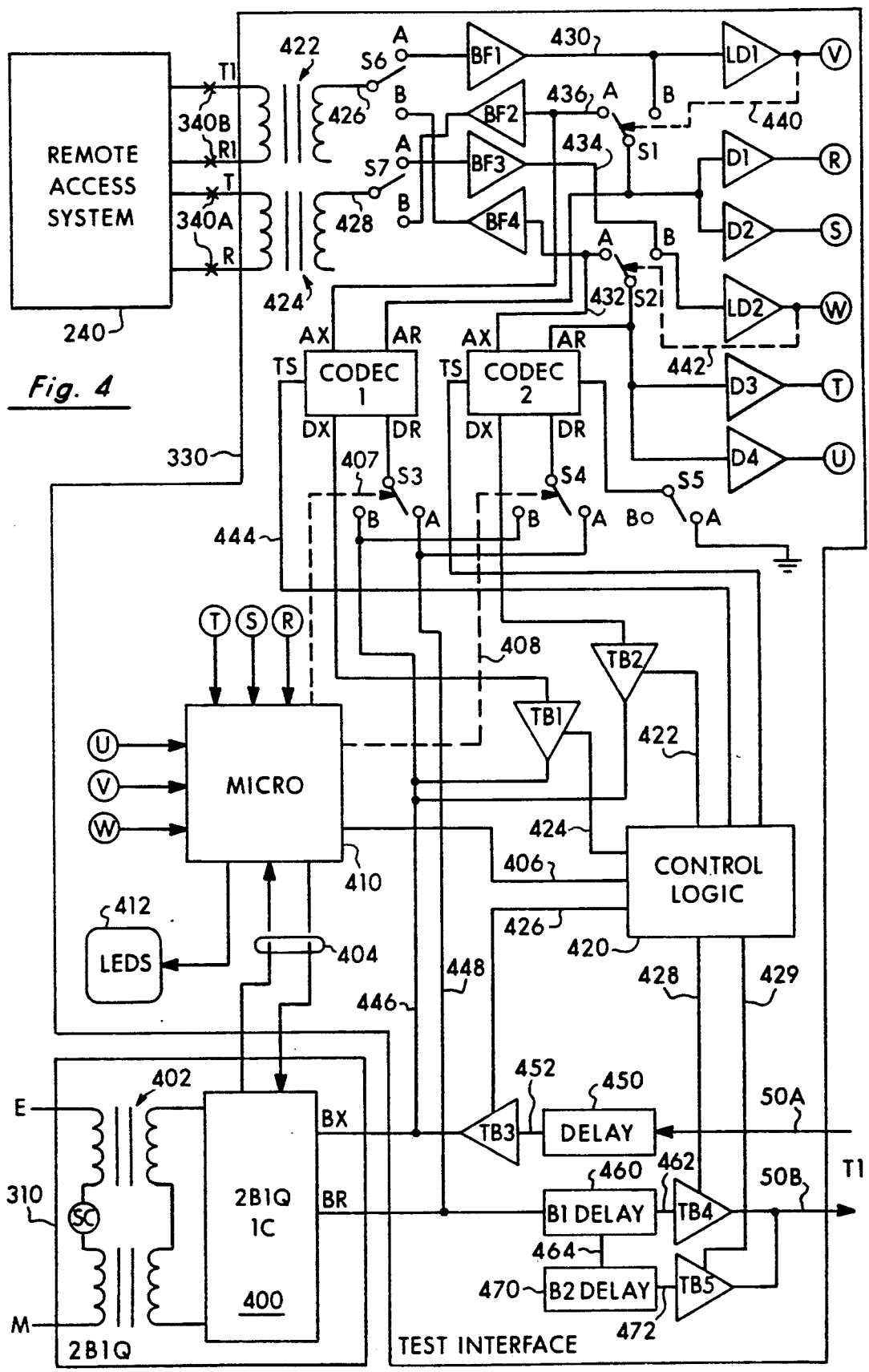
FIG. 4 sets forth the detail circuit arrangement of the test interface of the present invention.

In FIG. 4, the details of the test interface circuitry 330 of the present invention is shown. The test interface circuitry 330 is connected to the tip (T,T1) and ring (R,R1) to the remote access system 240. The test interface 330 is also interconnected to the common T1 carrier over lines 50A and 50B as shown. Line 50A delivers PCM signals in and line 50B delivers PCM signals out. The test interface 330 is interconnected to the 2B1Q circuit 310 over the BX and BR lines. The 2B1Q circuit 310 is connected to the E and M output lines 320 as shown in FIG. 3.

The 2B1Q circuit 310 utilizes a conventional 2B1Q integrated circuit chip 400 of the type, for example, manufactured by National Semiconductor as Model TP3410 "U" Interface Device. The outputs of the 2B1Q integrated circuit chip 400 are conventionally connected to transformers 402. The 2B1Q integrated circuit chip 400 receives the BX and BR signals from the test interface 330 as well as control signals over lines 404 from the microprocessor 410. The microprocessor 410 is located in channel unit 80 and is used to perform other functions within the unit. However, under the teachings of the present invention, the microprocessor 410 is also used to control the 2B1Q integrated circuit chip 400 as well as the test interface 330 as will be explained in the following. The microprocessor 410 is conventionally available from Motorola as Model No. 68HC05. The microprocessor 410 receives inputs R through W, drives light emitting diodes 412, controls the 2B1Q integrated circuit 400 over lines 404, controls logic 420 over lines 406 and controls two switches, S3 and S4 over linkages 407 and 408.

The test interface circuit 330 is composed of the following components. Two transformers 422 and 424 are individually connected with their outputs to the tip and ring leads (T, R, T1, R1) as shown in FIG. 4. Each transformer 422, 424 has a single input 426 and 428 which is connected to a single pole of switches S6 and S7. The switches S6 and S7 can switch between throw A or throw B. Throw A of switch 6 is connected to a signal buffer such as an operational amplifier BF1 whose output is connected to a level detector LD1. The output 430 of BF1 is also delivered to throw B of switch 1. Throw B of switch S6 is connected to the output of signal buffer BF4 whose input is connected to throw A of switch S2 and to input AX of CODEC 2. Throw A of switch S7 is connected to the input of signal buffer BF3 whose output 434 is delivered to throw B of switch S2 and to the input of level detector LD2. Finally, throw B of switch 7 is connected to the output of signal buffer BF2 whose input 436 is connected to throw A of switch 1 and is further connected to the AX input of CODEC 1.

Switches S6 and S7 function as follows. When an incoming signal is delivered on lines T1 and R1, the incoming signal is delivered through throw A of switch S6 to BF1. Likewise, when an incoming signal is on T and R, switch S7 is configured to deliver the signal through throw A to BF3. However, when it is desired to output signals, the signal to be outputted on T1, R1 is delivered through BF4 to throw B of switch S6. When it is desired to deliver a signal out over T, R, the output signal is delivered through BF2 through throw B of switch S7. The transformers 422 and 424 provide the necessary coupling between the remote access system 240 and the test interface 330.

The level detector LD1 connected to BF1 and the level detector LD2 connected to BF3 function to detect a slightly greater than 40 dB signal delivered from the buffers BF1 and BF3. The level detector LD1 has an output V which is normally high and upon detection of the slightly greater than 40 dB signal on line 430 goes low. The transition from high to low causes over linkage 440 switch S1 to switch from throw A to throw B. Likewise, the level detector LD2 detects a slightly greater than 40 dB signal appearing on lines 434 and upon this detection causes its output W to become low. This transition causes over linkage 442 switch S2 to switch from throw A to throw B. The transition signals V and W are delivered into the microprocessor 410 as shown. The level detectors LD1 and LD2 function to provide a distinction between local and distant testing which will be discussed in greater detail later.

The detectors D1, D2, D3 and D4 function to determine the presence of a 2713 Hz signal or a 2913 Hz signal. Detectors D1 (output R) and detector D3 (output T) detect the presence of 2713 Hz signals on lines T, R and T1, R1 respectively. Detectors D2 (output S) and D4 (output U) detect the presence of 2913 Hz on T, R and T1, R1 respectively. These two signals are well known loopback signals. Again, outputs R, S, T and U are delivered into the microprocessor 410. The transition from a high to a low indicating the presence of the detected signal.

Hence, the level detectors LD1 and LD2 as well as the frequency detectors D1 through D4 interrogate the signals on lines T,R and T1,R1 to ascertain the signal level and frequency of the signals. The detectors D1 to D4 handle the on/off timing for any detected tones and predetermined time durations such as 2 seconds. This information is fed back to the microprocessor 410 for processing. The microprocessor 410 activates the LEDs 412 to indicate the loopback condition.

The coder/decoder circuits, CODEC 1 and CODEC 2, serve to transform the signals between the analog and digital domains. CODEC 1 is responsible for receiving from lines T1, R1 and transmitting signals over lines T, R. CODEC 2 is responsible for transmitting over lines T1, R1 and receiving signals over lines T, R. In the preferred embodiment, both CODECs are commercially available as Model No. TP3054 from National Semiconductor.

The following abbreviations are used in FIG. 4:
AX=analog transmit
AR=analog receive
DX=digital transmit
DR=digital receive In FIG. 4, the analog transmit AX of CODEC 1 is connected to buffer BF2 for transmitting on lines T, R. The analog receive AR of CODEC 1 is connected to buffer BF1 which receives signals from line T1, R1. Hence, CODEC 1 transmits on T, R and receives on T1, R1. CODEC 2 is the reverse. CODEC 2 transmits on T1, R1 and receives on T, R.

It is clear that the conventional signaling from the remote testing system 230 which is delivered to the remote access system 240 as shown in FIG. 3 constitutes analog signals. Hence, CODECs 1 and 2 communicate with the remote access system 240 over lines T,R and T1,R1 in an analog fashion which, upon reference back to FIG. 2, provides the necessary conversion between the analog and 2B1Q signals so that the test interface 330 appears to the remote access system 240 and to the remote testing system 230 as if it were conventionally hooked up as shown in FIG. 2. CODECs 1 and 2 are interconnected over line 444 to the control logic 420 which provides the necessary time slot TS information.

The DX and DR outputs of CODECs 1 and 2 are interconnected as follows. The DX outputs are connected to tri-state buffers TB1 and TB2 which are commonly tied to line 446 which is interconnected to the BX input of the 2B1Q integrated circuit 400. The two DR outputs are connected to switches S3 and S4, respectively. The state of switches S3 and S4 are controlled by the microprocessor 410 over lines 407 and 408 respectively. When the switches S3 and S4 are activated to contact throw A, the signals are delivered over line 448 to the BR input of the 2B1Q integrated circuit 400. When switches S3 and S4 are activated to throw B, line 446 is accessed which is connected to the BX input of 2B1Q integrated circuit 400. The tri-state buffers are conventionally available from a number of suppliers or Model No. 74HC125. Each tri-state buffer TB1 and TB2 receives a third input from the control logic 420 over lines 422 and 424 respectively. The control logic 420 provides the necessary time slot enabling signals to properly activate the tri-state buffers during the correct time slot. This completes the interface between the remote testing system 230 and the E and M line for performing the loopback test from the remote testing system 230.

As mentioned, testing can also occur over the T1 carrier. PCM signals are delivered over the T1 carrier on lines 50A and 50B. The incoming signals on line 50A enter a delay circuit 450 and the delayed PCM incoming signals appear on line 452. These signals access a third tri-state buffer TB3 which is also controlled by lines 426 from the control logic 420. The output of buffer TB3 is connected to the BX input of the 2B1Q integrated circuit 400. Outgoing signals from the 2B1Q integrated circuit 400 are delivered on line BR to the B1 delay circuit 460 whose output 462 is delivered in to a fourth tri-state buffer TB4 over lines 462. Tri-state buffer TB4 is controlled by the logic 420 over lines 428. When B2 is selected, the signal is delivered over lines 464 into the B2 delay 470 for delivery over lines 472 to the fifth tri-state buffer TB5 which is controlled over lines 429 by the logic 420. The delays 450, 460, 470 are necessary for correct time slot insertion into and from the PCM data on the T1 carrier. These delays are conventional and are provided in the normal communication from the T1 carrier to the 2B1Q pair.

When it is desired to perform the test from a remote location, the necessary test signals are provided over the T1 carrier directly into the 2B1Q chip 400 from the distant location and into the detectors D1-D4. From the above it is clear that an important difference exists between the prior art approach of FIG. 2 and the present invention of FIGS. 3 and 4. The prior art approach detects the loopback tone at the DST whereas the detection of the tone, under the present invention, occurs at the channel bank. This is true whether originating from the remote or distant sources. Upon detection, a loopback message is then sent over the 2B1Q communication path into the DST where the loopback switches 210 then become activated.

Finally, switch S5 is set by the installer of the interface and the setting of this switch determines whether one private line data circuit B1 or two private line data circuits B1, B2 is provided to the customer. It is important to note that only one 2B1Q circuit over the E and M leads is provided in either case. However, CODEC 2 is disabled when only one private line data circuit is provided (i.e., B1) by opening contact A. CODEC 2 is enabled when ground is provided to contact A.

While a preferred circuit is provided in FIG. 4 for implementing the teachings of the present invention, it is to be expressly understood that other circuit embodiments could be utilized to implement the functions discussed above.

3. Operation of Test Interface

In Table I, the state table for conducting a number of loopback tests is set forth. The column marked "TEST" sets forth the specific type of test. For example, a local loopback test involving 2713 Hz for the B1 path is indicated in the first row of Table I. In addition, the settings for the components of FIG. 4 for the normal operation of the B1 and B2 paths are set forth. The various columns indicate the states of the various devices. Each test in the table is a separate and noninterfering test with respect to the other tests.

In the following, two examples of operation will be discussed. The first is a loopback test originating from the remote access system, the second originating from a distant location over the T1 carrier.

TABLE I

| TEST | S1 | S2 | S3 | S4 | S5 | S6 | S7 | TB1 | TB2 | TB3 | TB4 | TB5 | LD1 | LD2 | D1 | D2 | D3 | D4 |
|---|---|---|---|---|---|---|---|---|---|---|---|---|---|---|---|---|---|---|
| Remote Loopback 2713B1 | B | A | A | X | A | B |   | ON | OFF | OFF | OFF | X | LO | HI | LO | HI |   |   |
| Distant Loopback 2713B1 | A | A | B | X | B |   |   | OFF |   | ON | ON | X | HI |   | LO | HI |   |   |
| Remote Loopback 2713B2 | A | B |   | A | A | B | A | OFF | ON | OFF | X | OFF | HI | LO |   |   | LO | HI |
| Distant Loopback 2713B2 | A | A |   | B | A |   | B |   | OFF | ON | X | ON |   | HI |   |   | LO | HI |
| Remote Loopback 2913B1 | B | A | A | X | A | B |   | ON | OFF | OFF | OFF | X | LO | HI | HI | LO |   |   |
| Distant Loopback 2913B1 | A | A | B | X | B |   |   | OFF |   | ON | ON | X | HI |   | HI | LO |   |   |
| Remote Loopback 2913B2 | A | B |   | A | A | B | A | OFF | ON | OFF | X | OFF | HI | LO |   |   | HI | LO |
| Distant Loopback 2913B2 | A | A |   | B | A |   | B |   | OFF | ON | X | ON |   | HI |   |   | HI | LO |
| Normal Operation B1 | A | A | B | X |   |   |   | OFF |   | ON | ON | X | HI |   | HI | HI |   |   |
| Normal Operation B2 | A | A |   | B | A |   |   |   | OFF | ON | X | ON |   | HI |   |   | HI | HI |

X-DOESN'T MATTER

EXAMPLE I

The following example corresponds to the remote loopback test of 2713 Hz for the B1 circuit which corresponds to the first row of Table I.

The status of switches as shown, for example switch S1 in Table I shows that the pole for switch S1 is connected to throw B. Likewise, the states of the tri-state buffers TB1-5 are shown. Tri-state buffer TB1 is on and tri-state buffer TB2 is off. Likewise, the status of the level detectors LD1 and LD2 are shown to indicate their respective states as being a high or a low output. For this example, LD1 equals low and LD2 equals high. Finally, the states of the detectors D1 through D4 are set forth. For this example, detector D1 is low.

Figure 1:
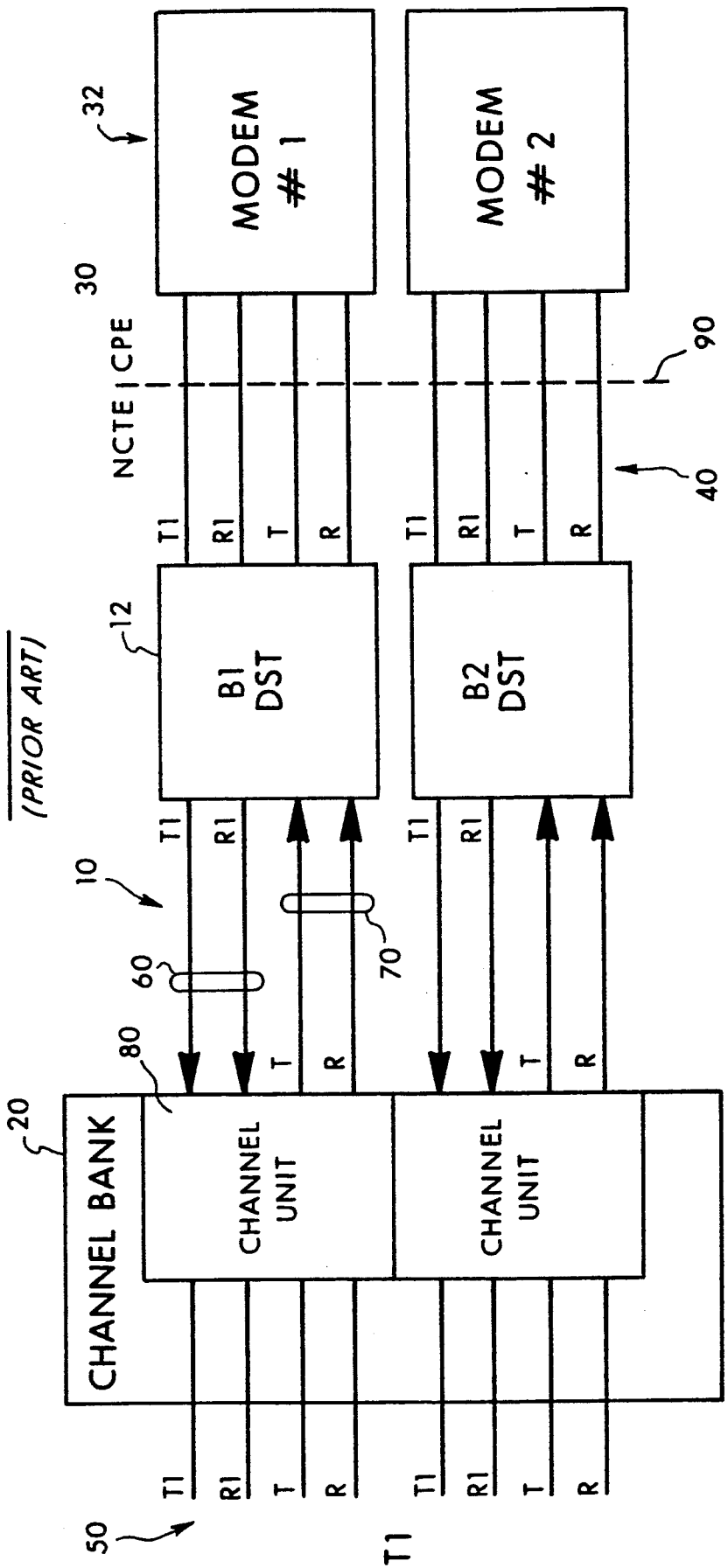
FIG. 1 is a block diagram of a prior art configuration showing interconnections of the channel bank with customer provided equipment.

In order to conduct the remote loopback 2713 Hz test for Bl, as shown in Table I, the remote access system 240 delivers the 2713 Hz signal on T1, R1 through BF1 to the level detector LD1. Level detector LD1 detects the level of the signal and transits from high to low causing switch S1 to connect to throw B. This delivers the analog tone signal to the AR input of CODEC 1. CODEC 1 converts the analog 2713 Hz tone to a digital signal. Before CODEC 1 can transmit the tone over DX, the detector D1 informs the microprocessor that it is in loopback. CODEC 1 now transmits this digital signal over DX into TB1 which is properly activated for the time slot TS by control logic 420. The output of TB1 is delivered into the BX input of the 2B1Q integrated circuit 400 and a digital message corresponding to this digital signal is transmitted outwardly over the E line to the 2B1Q circuit in the NCTE (which is shown in FIGS. 1 through 3) as a DST. As shown in FIG. 3, the message is received by the 2B1Q chip 310 at the DST 12 and is delivered to a microprocessor (not shown) which activates the loopback switches 210.

The loopback circuit is complete and return signals are delivered over the M lead to the 2B1Q chip 400 and is delivered out of the BR output to the A throw of switch 3 and into the DR input of CODEC 1. CODEC 1 converts the digital return signal to an analog signal. CODEC 1 now transmits this return analog signal over output AX which is delivered into BF2 whose output delivers the analog signal back to the remote access system 240 over T, R. Conventional testing of the loopback can now occur. The remaining loopback tests of Table I are conventional loopback tests. In normal operation, the states for the components of FIG. 4 are set forth.

EXAMPLE 2

The following discusses the operation of a distant test conducted over carrier T1 (i.e., the second row in Table I). For example, a 2713 Hz loopback test for B1 conducted from the distant location is shown as a second row in the state table of Table I. Here, tri-state buffer TB3 is on during the proper time slot as well as tri-state buffer TB4. The incoming signals delivered on 50A through delay 450 through tri-state buffer 452 into the BX input of circuit 400. The 2713 Hz signal from 50A is delivered to detector D1 (through B3, over line 445, to DR of CODEC 1, from AX of CODEC 1 to D1). The microprocessor receives a high to low signal on R and configures the interface 330 for conducting a B1 2713 Hz distant test.

The 2713 Hz signal on 50A 2B1Q format, is also delivered over line E and is returned over line M to be delivered out in a digital format over output BR of circuit 400. This is delivered into the B1 delay 460 and into the TB4 buffer which is turned on and out over line 50B of the T1 carrier. When the fixed frequency for a predetermined period of time is delivered over the T1 carrier 50A, line 446 delivers this digital loopback signal to the DR input of CODEC 1. The digital signal is converted to an analog signal for delivery to the level detectors and detectors as shown in Table I.

The control logic 420 implements the state table of Table I in a conventional fashion. Based upon the state table in Table I, it is apparent that the test interface 330 of the present invention is universal in its application in that the microprocessor 410 and control logic 420 upon receiving signals from detectors LD1, LD2, and D1 through D4 can configure switches S1 to S7 and buffers TB1 to TB5 appropriately to handle the incoming loopback test as explained in the above two examples, whether originating from a distant location such as over the T1 carrier or remotely such as from the remote testing.

It is to be expressly understood that the tests set forth in FIG. 5 are standard telephone operating company tests. However, the states set forth for the components shown in FIG. 4 permit the test interface 330 of the present invention to implement these conventional tests into the 2B1Q environment as set forth in FIG. 3.

The test interface 330 constantly monitors the status of the signals appearing on the R, T, R1, and T1 lines as well as on the T1 carrier during normal operation. During normal operation, the configuration of the components is set forth in the state table of Table I. Data flows from the T1 carrier into the 2B1Q chip 400 in normal operation and the interface 330 is transparent to the customer's use of the private data line circuit. However, when the fixed frequency (2713 Hz or 2913 Hz) is detected for a predetermined period of time such as 2 seconds, the interface 330 automatically configures according to the state table in Table I and the standard loopback tests are performed.

It is to be expressly understood that the claimed invention is not to be limited to the description of the preferred embodiment but encompasses other modifications and alterations within the scope and spirit of the inventive concept.

We claim:

1. A system for providing loopback testing of the private line data circuit between network channel termination equipment and a channel unit, said network channel equipment having a loopback detector, said channel unit having T, T1, R, R1, E, and M output leads, said system comprising:
    a single pair of wires connected to two of said output leads of said channel unit and to said network channel termination equipment,
    a first 2B1Q interface in said network channel termination equipment and connected to said single pair of wires,
    a second 2B1Q interface in said channel unit and connected to said single pair of wires, said first and second 2B1Q interfaces transmitting data between said network channel termination equipment and said channel unit at the basic rate of 2B+D over said single pair of wires,
    a remote access system connected to the remaining four of said output leads of said channel unit,
    a remote testing system connected to said remote access system,
    a test interface in said channel unit connected to said second 2B1Q interface and to said remote access system over said remaining four output leads,
    said remote testing system providing test signals for delivery through said remote access system, said test interface, said second 2B1Q interface, said single pair of wires, said first 2B1Q interface and to said loopback detector in said network channel equipment, said loopback detector upon receipt of said test signals for a predetermined period of time providing a loopback connection in said network channel termination equipment, said remote testing system transmitting a predetermined set of testing signals over said loopback connection and analyzing the received predetermined set of testing signals.

2. The system of claim 1 wherein said single pair of wires are connected to said E and M output leads.

3. A system for providing loopback testing of the private line data circuit between network channel termination equipment and a channel unit, said network channel equipment having a loopback detector, said system comprising:
    a single pair of wires connected to said channel unit and to said network channel termination equipment,
    a first 2B1Q interface in said network channel termination equipment and connected to said single pair of wires,
    a second 2B1Q interface in said channel unit and connected to said single pair of wires said first and second 2B1Q interfaces transmitting data between said network channel termination equipment and said channel unit at the basic rate of 2B+D over said single pair of wires,
    a test system connected to said channel unit,
    a test interface in said channel unit connected to said second 2B1Q interface and to said test system,
    said test system providing test signals for delivery through said test interface, said second 2B1Q interface, said single pair of wires, said first 2B1Q interface and to said loopback detector in said network channel equipment, said loopback detector upon receipt of said test signals for a predetermined period of time providing a loopback connection in said network channel termination equipment, said test system transmitting a predetermined set of testing signals over said loopback connection and analyzing the received predetermined set of testing signals.

4. A method for testing a private line data circuit consisting of an network channel termination equipment connected to a channel unit over a single pair of wire, the network channel termination equipment having a loopback circuit, the channel unit having T, T1, R, R1, E and M output leads, said method comprising the steps of:
    connecting one end of the single pair of wires to the E and M output leads of the channel unit,
    connecting the remaining end of the single pair of wires to the network channel termination equipment,
    providing 2B+D basic rate data transmission in a 2B1Q modulation format between the network channel termination equipment and the channel unit over the single pair of wires,
    selectively connecting between (a) a remote testing system to the T, T1, R, R1 leads of the channel unit and (b) the T1 carrier, said remote testing system delivering an analog loopback signal and said T1 carrier delivering a digital loopback signal,
    when connected to the remote testing system, delivering a message corresponding to said analog loopback signal from the connected remote testing system to the loopback circuit in the network channel termination equipment,
    when connected to the T1 carrier, delivering said message corresponding to said digital loopback signal from the T1 carrier to the loopback detector in the network channel termination equipment,
    the loopback detector in the network channel termination equipment in response to the delivered message closing a loopback path,
    testing the loopback path with a predetermined set of test signals.

5. A method for testing a private line data circuit consisting of an network channel termination equipment connected to a channel unit over a single pair of wire, the network channel termination equipment having a loopback circuit, said method comprising the steps of:
    connecting one end of the single pair of wires to the channel unit,
    connecting the remaining end of the single pair of wires to the network channel termination equipment,
    providing 2B+D basic rate data transmission in a 2B1Q modulation format between the network channel termination equipment and the channel unit over the single pair of wires,
    selectively connecting between (a) a remote testing system to and (b) the T1 carrier to the channel unit, said remote testing system delivering an analog loopback signal and said T1 carrier delivering a digital loopback signal,
    when connected to the remote testing system, delivering a message corresponding to said analog loopback signal from the connected remote testing system to the loopback circuit in the network channel termination equipment, when connected to the T1 carrier, delivering said message corresponding to said digital loopback signal from the T1 carrier to the loopback detector in the network channel termination equipment interval, the loopback detector in the network channel termination equipment in response to the delivered message closing a loopback path, testing the loopback path with a predetermined set of test signals.

6. A system for testing a 2B1Q private line data circuit between network channel equipment and a channel unit, said system comprising:

means (230, 240) for providing a fixed frequency analog signal for a predetermined period of time thereby setting up a loopback circuit in said private line data circuit so as to perform a series of analog tests on said loopback circuit, means (330) connected to said providing means for converting said fixed frequency analog signal and said analog tests to digital signals, said converting means transmitting said digital signals into said 2B1Q private line data circuit to set up and test said loopback circuit, said converting means further converting received digital signals from said loopback circuit into analog signals for delivery into said providing means.

7. The system of claim 6 wherein said converting means further comprises:

means (LD1, LD2) connected to said providing means for detecting the level of said fixed frequency analog signal for said predetermined period of time, means (D1, D2, D3, D4) for detecting said fixed frequency, means for converting analog signals received from said providing means into digital signals and for further converting digital signals received from said 2B1Q loopback circuit into analog signals, means (410, 420) receptive of signals from said level detecting means and from said frequency detecting means for controlling the conversion of said analog and digital signals.

8. (Amended Twice) A system for testing a 2B1Q private line data circuit between network channel equipment and a channel unit, said channel unit having T, T1, R, R1, E and M leads, said system comprising:

means (230, 240) connected to four of said T, T1, R, R1, E and M leads for providing a fixed frequency analog signal for a predetermined period of time thereby setting up a loopback circuit in said private line data circuit so as to perform a series of analog tests on said loopback circuit, means (330) connected to said providing means for converting said fixed frequency analog signal and said analog tests to digital signals, said converting means transmitting said digital signals into said 2B1Q private line data circuit to set up and test said loopback circuit, said converting means further converting received digital signals from said loopback circuit into analog signals for delivery into said providing means.

9. The system of claim 8 wherein said converting means further comprises:

means (LD1, LD2) connected to said providing means for detecting the level of said fixed frequency analog signal for said predetermined period of time, means (D1, D2, D3, D4) for detecting said fixed frequency, means for converting analog signals received from said providing means into digital signals and for further converting digital signals received from said 2B1Q loopback circuit into analog signals, means (410, 420) receptive of signals from said level detecting means and from said frequency detecting means for controlling the conversion of said analog and digital signals.

* * * * *

UNITED STATES PATENT AND TRADEMARK OFFICE
CERTIFICATE OF CORRECTION

PATENT NO. : 5,140,625

DATED : August 18, 1992

INVENTOR(S) : Peter M. Reum and Terry D. Bolinger

It is certified that error appears in the above-identified patent and that said Letters Patent is hereby corrected as shown below:

In the drawing, Sheet 4, Figure 4, the reference numerals "422, 424, 426, and 428" denoting lines emanating from the CONTROL LOGIC block of the TEST INTERFACE should be respectively redesignated as -- 422a, 424a, 426a, and 428a --

Column 5, line 48, delete "to" and substitute -- of --

Column 6, line 62, delete "detector"

Column 7, line 1, delete "indicating" and substitute -- indicates --

Column 7, line 64, delete "422 and 424" and substitute -- 422a and 424a --

Column 8, line 9, delete "426" and substitute -- 426a --

Column 8, line 16, delete "428" and substitute -- 428a --

Column 9, line 19, delete "as shown," and substitute -- are shown --

Column 9, line 52, delete "is" and substitute -- are --

Column 10, line 19, delete "signals delivered" and substitute -- signals are delivered --

Column 10, line 22, delete "B3, over line 445" and substitute -- TB3, over line 446 --

Column 10, line 31, delete "buffer which is turned on" and substitute -- buffer, which is turned on, --

Column 10, line 51, delete "FIG. 5" and substitute -- FIG. 4 --

UNITED STATES PATENT AND TRADEMARK OFFICE
CERTIFICATE OF CORRECTION

PATENT NO. : 5,140,625
DATED : August 18, 1992
INVENTOR(S) : Peter M. Reum and Terry D. Bolinger It is certified that error appears in the above-indentified patent and that said Letters Patent is hereby corrected as shown below:

Column 12, line 62 (claim 5, line 17), delete "to"

Column 14, line 7 (claim 8, line 1), delete "(Amended Twice)"

Signed and Sealed this

Twelfth Day of October, 1993

Attest:

BRUCE LEHMAN

*Attesting Officer*   *Commissioner of Patents and Trademarks*